United States Patent
Michael et al.

(10) Patent No.: US 9,678,995 B2
(45) Date of Patent: Jun. 13, 2017

(54) SYSTEM AND METHOD FOR PLANNED MIGRATION OF SERVICE CONNECTIONS

(71) Applicant: ORACLE INTERNATIONAL CORPORATION, Redwood Shores, CA (US)

(72) Inventors: Nicolas Michael, Redwood Shores, CA (US); Jean De Lavarene, Menlo Park, CA (US); Tong Zhou, Merrick, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 225 days.

(21) Appl. No.: 14/273,192

(22) Filed: May 8, 2014

(65) Prior Publication Data

US 2015/0324354 A1    Nov. 12, 2015

(51) Int. Cl.
  *G06F 7/00*     (2006.01)
  *G06F 17/00*    (2006.01)
  (Continued)

(52) U.S. Cl.
  CPC ........ *G06F 17/303* (2013.01); *G06F 12/0813* (2013.01); *G06F 12/0815* (2013.01);
  (Continued)

(58) Field of Classification Search
  CPC ......... G06F 17/30345; G06F 17/30289; G06F 17/30371; G06F 17/30598; G06F 17/30864
  (Continued)

(56) References Cited

U.S. PATENT DOCUMENTS 7,257,625 B2    8/2007  Wu
7,978,544 B2    7/2011  Bernard
(Continued)

FOREIGN PATENT DOCUMENTS

WO    2006073865    7/2006
WO    2012037163    3/2012

OTHER PUBLICATIONS

Anonymous, Database Connection Pool Management, Research Disclosure, Dec. 1, 1998, 3 pages, vol. 41, No. 416, Mason Publications, Hampshire, GB.
(Continued)

*Primary Examiner* — Hosain Alam
*Assistant Examiner* — Nicholas Allen
(74) *Attorney, Agent, or Firm* — Tucker Ellis LLP (57) ABSTRACT

A system and method for a planned migration of service connections from a first database instance to a second database instance in a clustered database. In accordance with an embodiment, a data source and connection pool enable access by a software application to a service on the first database instance. The data source is associated with a parameter specifying a delay-for-planned-draining, and a parameter specifying a planned-draining-period, which are used to rebalance connections when relocating a service. When a service is stopped on the first database instance, the connection pool receives a "service down" event from a notification service, and maintains the connections up to a time corresponding to the delay-for-planned-draining. When a "service up" event is received, the connection pool spreads migration of the connections from the first to second database instance over the planned-draining-period.

20 Claims, 9 Drawing Sheets

(51) Int. Cl.
  *G06F 17/30* (2006.01)
  *G06F 12/0815* (2016.01)
  *G06F 12/0813* (2016.01)
  *G06F 12/0868* (2016.01)

(52) U.S. Cl.
  CPC .... *G06F 12/0868* (2013.01); *G06F 17/30345* (2013.01); *G06F 17/30902* (2013.01); *G06F 2212/465* (2013.01)

(58) Field of Classification Search
  USPC .......................................................... 707/609
  See application file for complete search history.

(56) References Cited

U.S. PATENT DOCUMENTS

| | | | |
|---|---|---|---|
| 9,229,993 | B2 | 1/2016 | Odenheimer |
| 2004/0088413 | A1 | 5/2004 | Bhogi |
| 2005/0028164 | A1 | 2/2005 | Neuwald |
| 2005/0038801 | A1* | 2/2005 | Colrain ............ G06F 17/30289 |
| 2006/0143396 | A1 | 6/2006 | Cabot |
| 2006/0146878 | A1 | 7/2006 | Srivastava |
| 2009/0064199 | A1 | 3/2009 | Bidelis et al. |
| 2010/0322255 | A1* | 12/2010 | Hao .................. G06F 9/45558 370/398 |
| 2011/0218981 | A1 | 9/2011 | Retnakumari |
| 2012/0066363 | A1 | 3/2012 | Somogyi |
| 2012/0096134 | A1* | 4/2012 | Suit ..................... G06F 9/5072 709/221 |
| 2012/0136602 | A1 | 5/2012 | Hossain |
| 2012/0166483 | A1* | 6/2012 | Choudhary ....... G06F 17/30545 707/770 |
| 2012/0233407 | A1 | 9/2012 | Choi |
| 2012/0278293 | A1* | 11/2012 | Bulkowski ........ G06F 17/30575 707/703 |
| 2012/0281706 | A1* | 11/2012 | Agarwal ............. H04L 67/1002 370/395.53 |
| 2013/0018919 | A1 | 1/2013 | Peek |
| 2013/0117289 | A1* | 5/2013 | Fischer ................. G06F 17/303 707/756 |
| 2013/0124807 | A1* | 5/2013 | Nielsen ............... G06F 11/1438 711/162 |
| 2013/0144984 | A1 | 6/2013 | Zhao |
| 2013/0290249 | A1* | 10/2013 | Merriman ......... G06F 17/30578 707/610 |
| 2014/0129592 | A1 | 5/2014 | Samudrala |

OTHER PUBLICATIONS

International Searching Authority at the European Patent Office, International Search Report and Written Opinion for PCT International Patent Application No. PCT/US2014/035187, Aug. 5, 2014, 11 pages.

United States Patent and Trademark Office, Office Action Dated May 17, 2016 for U.S. Appl. No. 14/253,580, 12 pages.

United States Patent and Trademark Office, Office Action Dated Mar. 20, 2017 for U.S. Appl. No. 14/253,573, 12 pages.

* cited by examiner

SYSTEM AND METHOD FOR PLANNED MIGRATION OF SERVICE CONNECTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to U.S. Patent Application titled "SYSTEM AND METHOD FOR CONNECTION LABELING FOR USE WITH CONNECTION POOLS", application Ser. No. 13/912,086, filed Jun. 6, 2013, now U.S. Pat. No. 9,251,178, issued Feb. 2, 2016; U.S. Patent Application titled "SUPPORT FOR CLOUD-BASED MULTI-TENANT ENVIRONMENTS USING CONNECTION LABELING", application Ser. No. 13/912,098, filed Jun. 6, 2013, now U.S. Pat. No. 9,268,798, issued Feb. 23, 2016; U.S. Patent Application titled "SYSTEM AND METHOD FOR PROVIDING A SECOND LEVEL CONNECTION CACHE FOR USE WITH A DATABASE ENVIRONMENT", application Ser. No. 14/253,580, filed Apr. 15, 2014, now U.S. Pat. No. 9,569,472, issued Feb. 14, 2017; and U.S. Patent Application titled "SYSTEM AND METHOD FOR PROVIDING A SHARABLE GLOBAL CACHE FOR USE WITH A DATABASE ENVIRONMENT", application Ser. No. 14/253,573, filed Apr. 15, 2014; each of which above applications are herein incorporated by reference.

FIELD OF INVENTION

Embodiments of the invention are generally related to application servers, databases, and connection pools, and are particularly related to a system and method for a planned migration of service connections in a clustered database or multi-tenant environment.

BACKGROUND

Databases such as the Oracle Real Application Clusters (RAC) can be configured to support multi-tenancy. For example, a multi-tenant RAC database can provide a container database (CDB) that can host multiple separate pluggable databases (PDB). Each PDB can act as a self-contained, fully functional database, and includes information specific to the PDB itself. The clustered database supports the use of services, which can then be accessed by requesting applications, such as tenant applications.

In a multi-tenant environment which uses a clustered database, each service typically resides on a single database instance, which provides better performance. In some situations, a database administrator may want to relocate a service from one database instance to another database instance, at runtime and with minimal impact on a requesting application, e.g., a tenant application.

For example, a service may need to be relocated for provisioning purposes, when one or more database instances are added to a RAC system to accommodate an increased number of tenants, or when an existing database instance needs to be shut down for maintenance.

Typically, when a service is relocated, a connection pool, e.g., Oracle Universal Connection Pool (UCP), must close all its connections to an existing service immediately after the service is stopped on a source database instance, which may lead to a disconnect storm. Additionally, the connection pool cannot reestablish the connections to the service before the service comes back up on a different database instance, which may lead to a logon storm. These are the general areas that embodiments of the invention are intended to address.

SUMMARY

Described herein is a system and method for a planned migration of service connections from a first database instance to a second database instance in a clustered database environment. In accordance with an embodiment, a data source and connection pool enable access by a software application to a service on the first database instance. The data source is associated with a parameter specifying a delay-for-planned-draining, and a parameter specifying a planned-draining-period, which are used to rebalance connections when relocating a service. When a service is stopped on the first database instance, the connection pool receives a "service down" event from a notification service, and maintains the connections up to a time corresponding to the delay-for-planned-draining. When a "service up" event is received, the connection pool spreads migration of the connections from the first to second database instance over the planned-draining-period.

DETAILED DESCRIPTION

As generally described above, a database administrator sometimes may need to relocate a service from one database instance to another. For example, a service may need to be relocated for provisioning purposes, when one or more database instances are added to a RAC system to accommodate an increased number of tenants, or when an existing database instance needs to be shut down for maintenance.

Typically, when a service is relocated, a connection pool, e.g., Oracle Universal Connection Pool (UCP), must close all its connections to an existing service immediately after the service is stopped on a source database instance, which may lead to a disconnect storm. Additionally, the connection pool cannot reestablish the connections to the service before the service comes back up on a different database instance, which may lead to a logon storm.

For example, with online transaction processing (OLTP) workloads, where connection requests from a requesting application typically happen at a very high rate, a disconnect storm can occur because no connections are available to serve the connection requests. The connection pool cannot reestablish connections to the service until after the service comes back up on a new database instance, which can take sub-seconds and in some cases can take several seconds, for example in cases of pluggable database (PDB) services which require the PDB to be opened first. When the service eventually comes back up, client requests can face empty buffer cache, leading to 100% remote buffer gets or disk reads for the first requests.

Additionally, the disconnect storm and logon storm, cold buffer cache, and in some cases longer a time between a "service down" and "service up", can cause a significant dip in throughput and a spike in response times, plus eventually short service outage.

Described herein is a system and method for a planned migration of service connections from a first database instance to a second database instance in a clustered database environment. In accordance with an embodiment, a data source and connection pool enable access by a software application to a service on the first database instance. The data source is associated with a parameter specifying a delay-for-planned-draining, and a parameter specifying a planned-draining-period, which are used to rebalance connections when relocating a service. When a service is stopped on the first database instance, the connection pool receives a "service down" event from a notification service, and maintains the connections up to a time corresponding to the delay-for-planned-draining. When a "service up" event is received, the connection pool spreads migration of the connections from the first to second database instance over the planned-draining-period.

In accordance with an embodiment, the above-described implementation can be used to relocate singleton services as well as multi-instance services at runtime, when minimal impact on requesting applications is desired.

Figure 1:
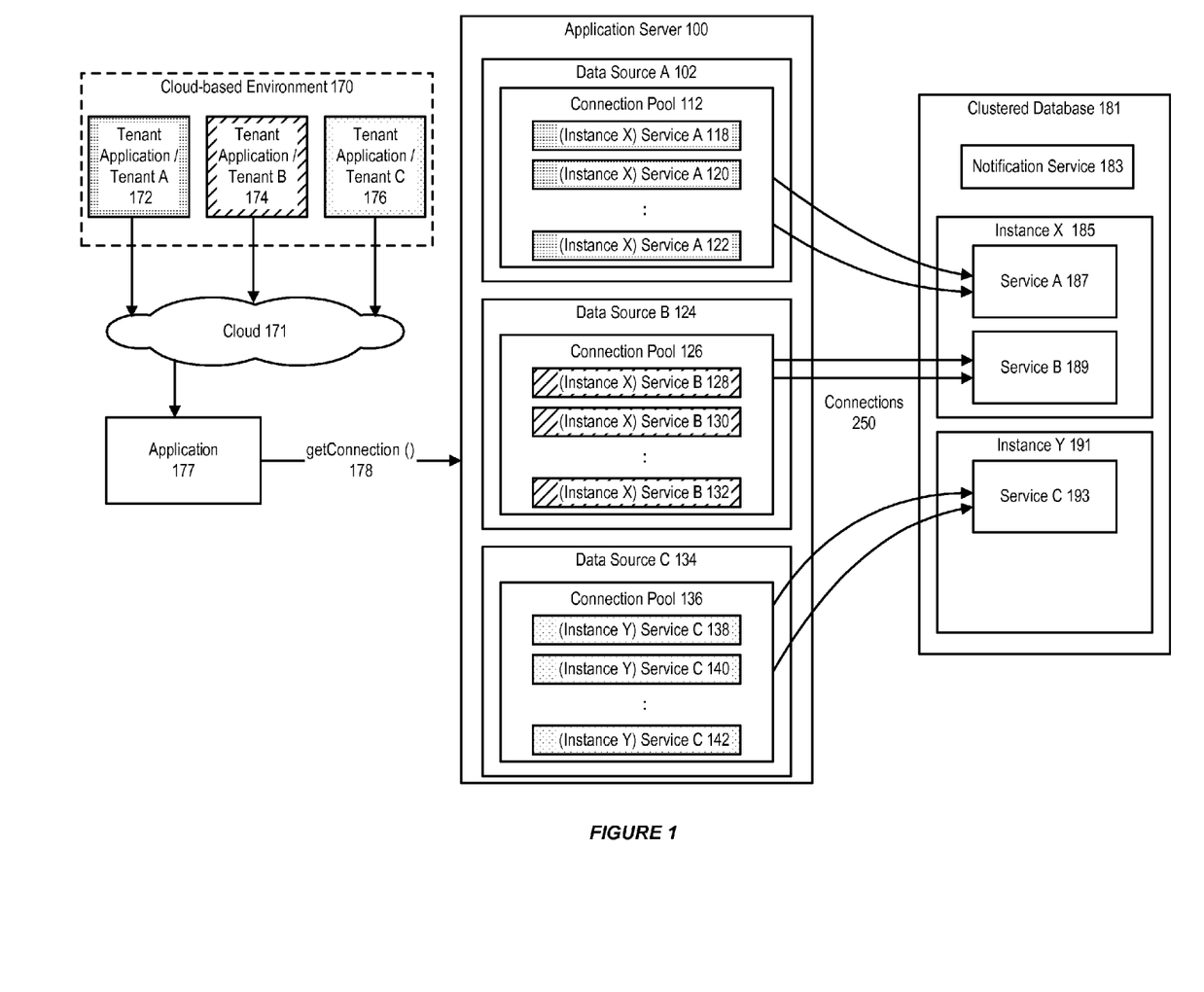
FIG. 1 illustrates a system that can utilize a planned migration of service connections in a clustered database environment, in accordance with an embodiment.

FIG. 1 illustrates a system that can utilize a planned migration of service connections in a clustered database environment, in accordance with an embodiment.

As shown in FIG. 1, in accordance with an embodiment, the system includes a clustered database 181, an application server 100 and a cloud-based environment 170 with a plurality of tenants or tenant applications 172, 174 and 176. The tenant applications can access, via a cloud 171, one or more software applications 177 that can request connections 178 from the application server to access the clustered database.

In accordance with an embodiment, the clustered database includes a plurality of database instances (e.g., Instance X 185 and Instance Y 191), and a notification service 183 that broadcasts notification events describing state changes in the plurality of database instances.

In accordance with an embodiment, a plurality of database services can be provided by the database instances. As an illustrative example, as shown in FIG. 1, Instance X provides Services A 187 and B 189, while Instance Y provides Service C 193.

In accordance with an embodiment, each service can be a singleton service and expose a single PDB on a single database instance. In accordance with an embodiment, a tenant or tenant application can be associated with a single PDB through a service, which allows all database queries from that tenant or tenant application to be routed to a same database instance, resulting in better performance through cache awareness and affinity.

In accordance with an embodiment, the application server can include a plurality of data sources 102, 124, and 134, each of which includes a connection pool 112, 126 and 136. Each connection pool can include a plurality of connection objects, 118 through 122, 128 through 132, and 138 through 142. In accordance with an embodiment, each of the connection objects represents a physical connection that can be used by a software application to connect 250 to a database instance.

In accordance with an embodiment, the connection objects, or connections, provided by a particular data source can be configured for a particular service. Each connection object can be used to connect to a database instance that provides that particular service.

As shown in FIG. 1, as an illustrative example, data source A provides connections for Service A on Instance X, whereas data source C provides connections for Service C on Instance Y.

In accordance with an embodiment, a connection request can include the name of a requested service in a connection string, which can be used by a data source to locate a particular connection configured for that service, in a connection pool associated with the data source.

Service Connections Migration

Figure 2:
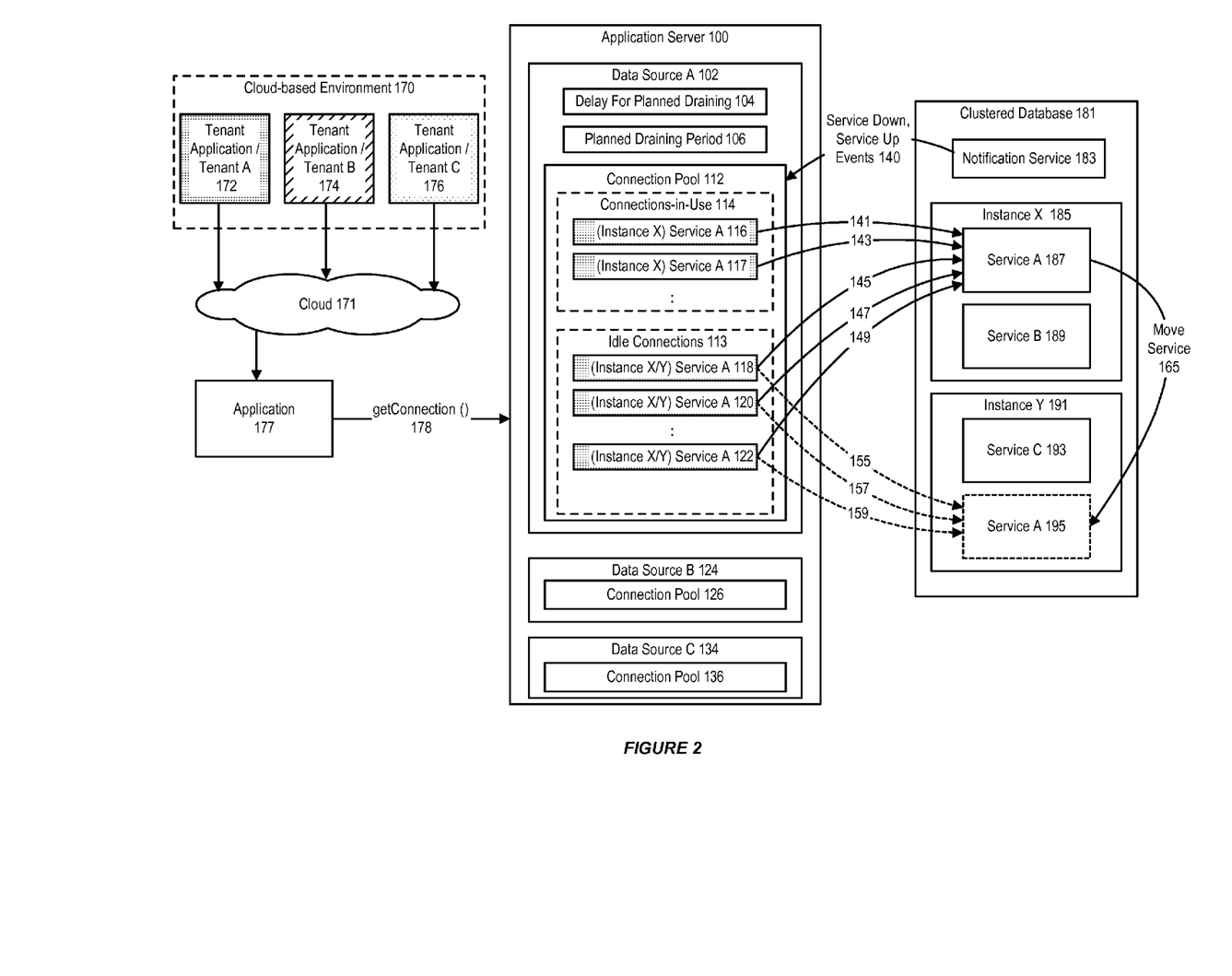
FIG. 2 illustrates a planned migration of service connections in a clustered database environment, in accordance with an embodiment.

FIG. 2 illustrates a planned migration of service connections in a clustered database environment, in accordance with an embodiment.

As shown in FIG. 2, in accordance with an embodiment, a data source A 102 can be associated with two parameters: a delay-for-planned-draining parameter 104, and a planned-draining-period parameter 106.

In accordance with an embodiment, a delay-for-planned-draining parameter can specify a delay-for-planned-draining or time period for which the connection pool 112 has to wait for before starting to migrate the connections therein.

In accordance with an embodiment, a planned-draining-period parameter 106 can specify a planned-draining-period or time period during which migration of the connections can be spread over.

As further shown in FIG. 2, by way of illustration, the connection pool can include connections that are either in use or busy 114, and idle 113. In accordance with an embodiment, each of the busy connections (e.g., 116 and 117) and idle connections (e.g., 118 through 122) represents a physical connection (e.g., 141 through 149) being used or available for request, to access a service (e.g., Service A) on Instance X.

In accordance with an embodiment, a database administrator can migrate or move 165 a service, by first stopping an instance of the service (e.g., Service A 187) on a source database instance (e.g., Instance X 185), and then starting a different instance of the service (e.g., Service A 195) on a target database instance (e.g., Instance Y 191). When the administrator determines to make such a move, it can be considered a planned migration of the service (rather than, for example, a failover of the service).

In accordance with an embodiment, the notification service can detect the state changes in the clustered database, and send notification events, e.g., "service down" or "service up" events 140, to the application sever.

As an illustrative example, as shown in FIG. 2, in accordance with an embodiment, when Service A is stopped on Instance X, the notification service can detect the change and broadcast a "service down" event. Similarly, when Service A comes back up on Instance Y, the notification service can detect the state change and broadcast a "service up" event.

In accordance with an embodiment, the connection pool can be configured to run or otherwise execute its delay-for-planned-draining actions in response to receiving the "service down" event; and its planned-draining-period actions in response to receiving the "service up" event.

In accordance with an embodiment, during the period of delay and before receiving the "service up" event, the connection pool can be configured to continue using existing connections to Instance X, busy or idle, to serve a requesting software application and prevent any new connection from being established through Service A to the database instance.

In accordance with an embodiment, if no "service up" event is received when the time period defined by the delay-for-planned-draining parameter elapses, then all connections to Service A on Instance X can be closed.

In accordance with an embodiment, when the "service up" event is received within the period of delay, then the connection pool can immediately start to migrate the idle connections. In accordance with an embodiment, migrating a connection can include disconnecting the connection (e.g., 145, 147, or 149) to Service A on the source instance (e.g., Instance X), and establishing a corresponding new connection (155, 157 or 159) to the service on the target instance (e.g., Instance Y).

In accordance with an embodiment, the connection migration can be equally spread over the time period defined by the planned-draining-period parameter.

In accordance with an embodiment, the connection pool can be configured to wait for a busy connection to be returned to the pool before migrating the connection.

Figure 3:
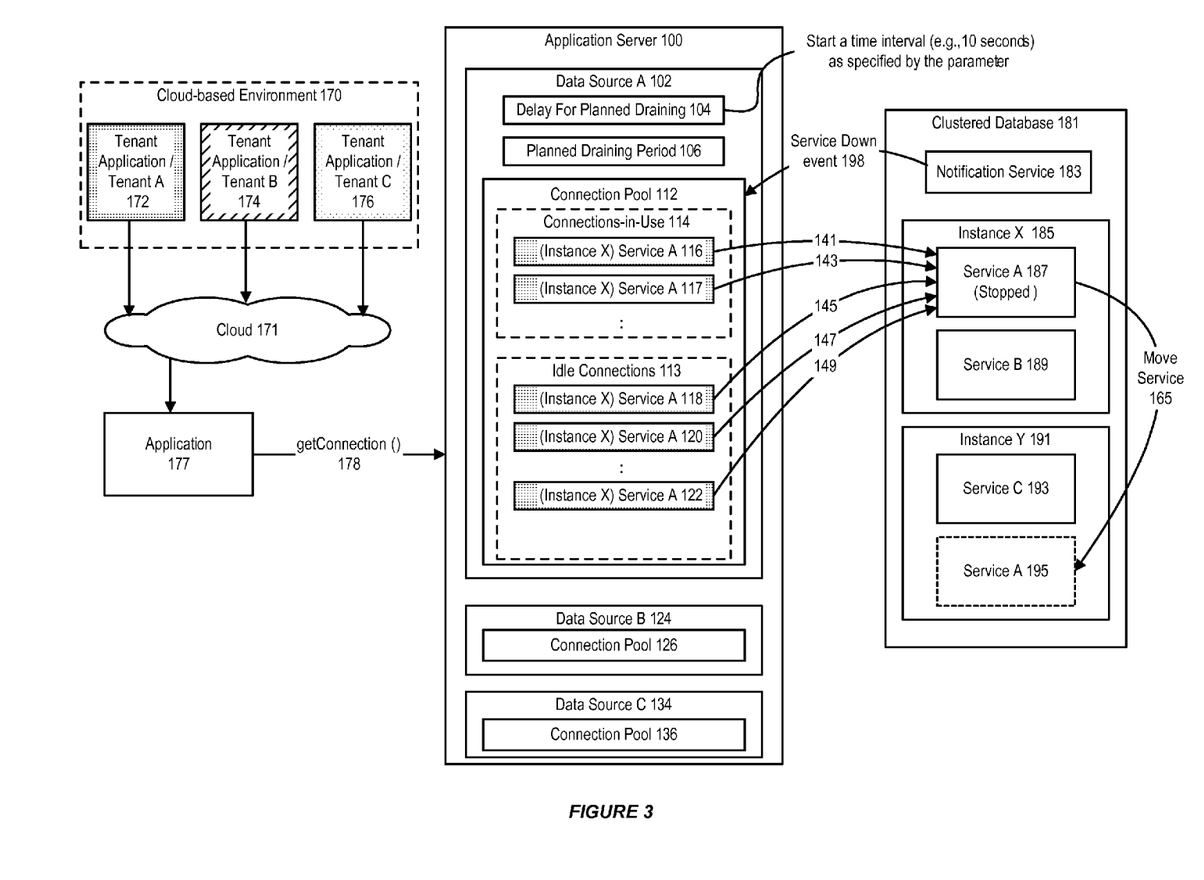
FIG. 3 further illustrates a planned migration of service connections in a clustered database environment, in accordance with an embodiment.

FIG. 3 further illustrates a planned migration of service connections in a clustered database environment, in accordance with an embodiment.

As shown in FIG. 3, when a database administrator moves 165 a service from a first database instance to another using, e.g., a command line, the service can be stopped first on the source instance (e.g., Instance X). In accordance with an embodiment, after the service is stopped, then no new connections can be established to the source instance through the service; however, any existing connections that have been established to the service can continue to be used by the a software application to access the source instance.

In accordance with an embodiment, the notification service can detect the state change caused by the stopped service in the clustered database, and broadcast a "service down" event 198, which can be received by the data source. In accordance with an embodiment, the "service down" event can trigger the delay-for-planned-draining to run.

In accordance with an embodiment, during the period of delay, the connection pool can be configured to continue allocating idle connections to connection reserve requests from a requesting software application, and the source instance can continue serving the busy connections. In accordance with an embodiment, the delay-for-planned-draining can provide a window for the service to prepare or otherwise get ready on the target service (Instance Y) to receive new connections.

Figure 4:
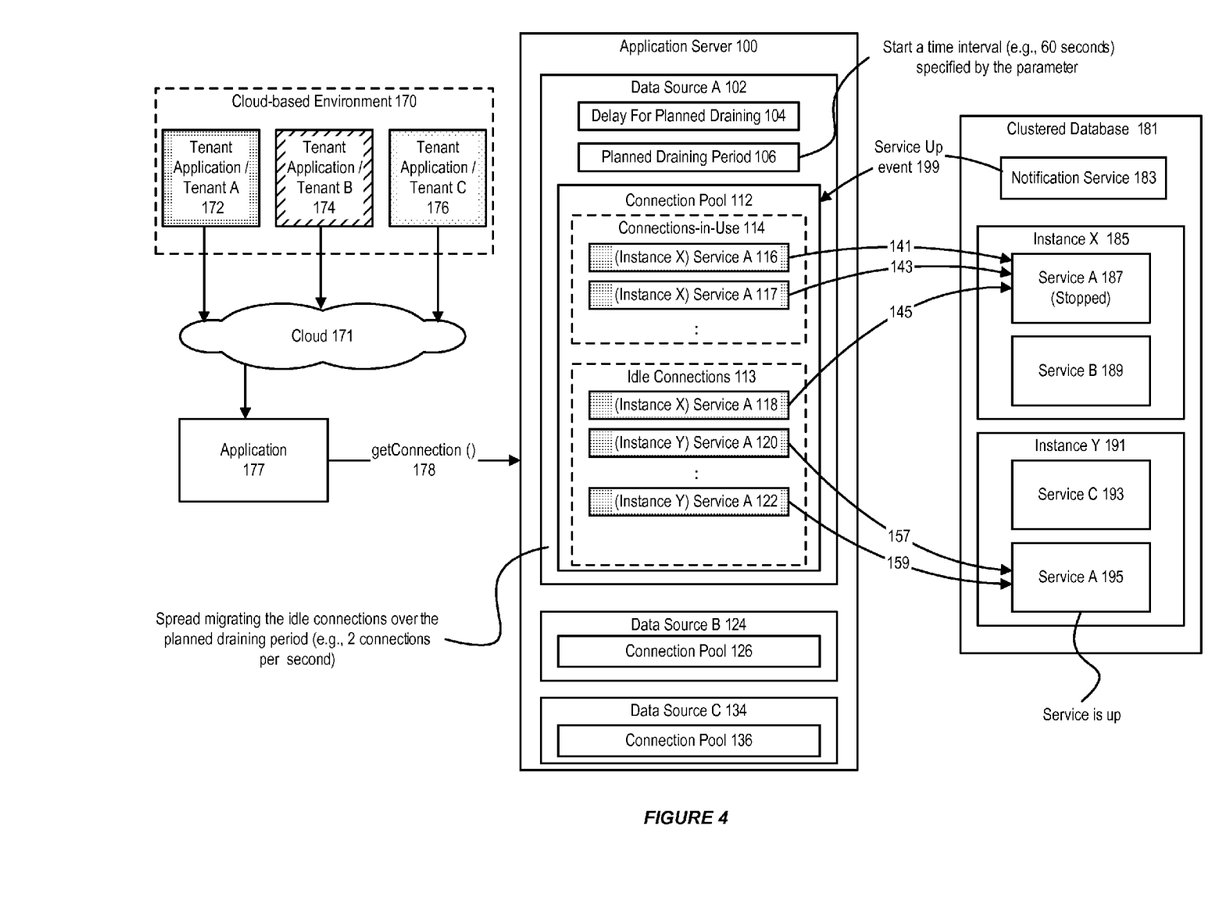
FIG. 4 further illustrates a planned migration of service connections in a clustered database environment, in accordance with an embodiment.

FIG. 4 further illustrates a planned migration of service connections in a clustered database environment, in accordance with an embodiment.

As shown in FIG. 4, in accordance with an embodiment, when an instance of Service A 195 is up and ready on the target database instance for receiving new connections, then the notification service can detect the state change, and broadcast a "service up" event 199, which can be received by the database source. In accordance with an embodiment, the "service up" event can trigger the planned draining period to run.

In accordance with an embodiment, the connection pool can be configured to receive the "service up" event and immediately start reconnecting the idle connections in the pool to the service on the target instance (e.g., Instance Y), but not all at once; instead, the reconnecting can be equally spread over the configured time interval, i.e. the planned-draining-period.

As an illustrative example, if the planned-draining-period is configured to 60 seconds, and the pool has a maximum size of 120 connections, then the connection pool (e.g., UCP) can close and reconnect an average 2 idle connections per second.

In accordance with an embodiment, reconnecting an idle connection can include terminating the physical connection (e.g., 147 or 149 as shown in FIG. 3) to the source database instance (e.g., Instance X), and establishing a corresponding physical connection (e.g., 157 or 159) to the service on the target database instance (e.g., Instance Y). In accordance with an embodiment, each reconnected idle connection can be available for request by a software application.

In accordance with an embodiment, during the planned-draining-period, both the source and target instances, which share the same storage of data, can serve the software application.

Figure 5:
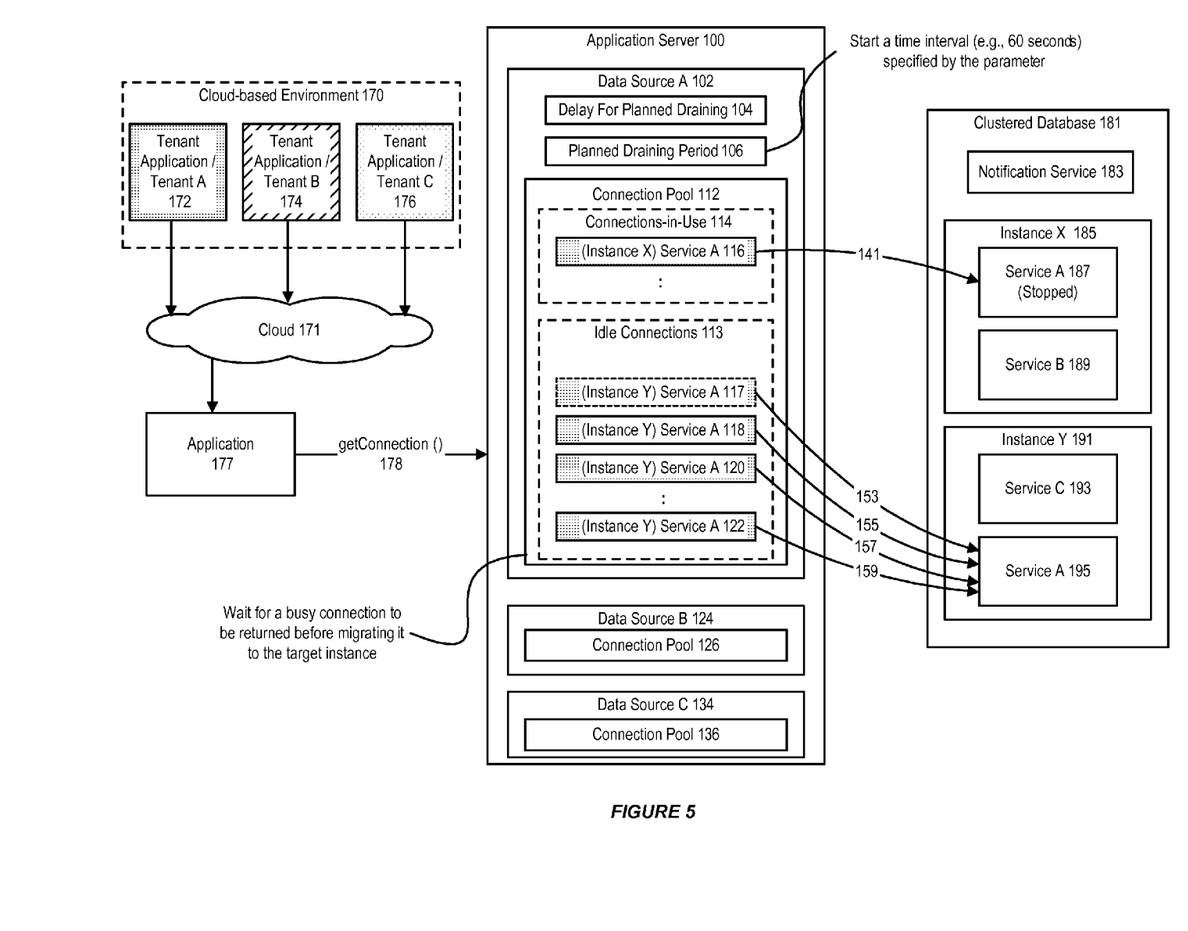
FIG. 5 further illustrates a planned migration of service connections in a clustered database environment, in accordance with an embodiment.

FIG. 5 further illustrates a planned migration of service connections in a clustered database environment, in accordance with an embodiment.

In accordance with an embodiment, during the planned-draining-period, the connection pool does not migrate a busy connection before the connection is released to the connection pool. As an illustrative example, as shown in FIG. 5, the connection object 117 has to be released into the pool and become idle before the physical connection 143 (as shown in FIG. 4) to the source instance can be terminated and a corresponding physical connection 153 can be established to the target instance.

In accordance with an embodiment, no in-flight transactions are created by the planned migration, which would typically happen in a failover situation where transaction replays may be needed to ensure transaction integrity and continuity.

In accordance with an embodiment, the planned migration feature can address many problems that a database administrator faces in relocating services for e.g., database maintenance. For example, with this feature, connections can be migrated from one database instance to another in a smooth manner and with minimal impact on client applications, e.g., tenant applications. Similarly, a client application will not experience a disconnect storm or a logon storm that is often experienced when a current approach of service migration is being used.

Figure 6:
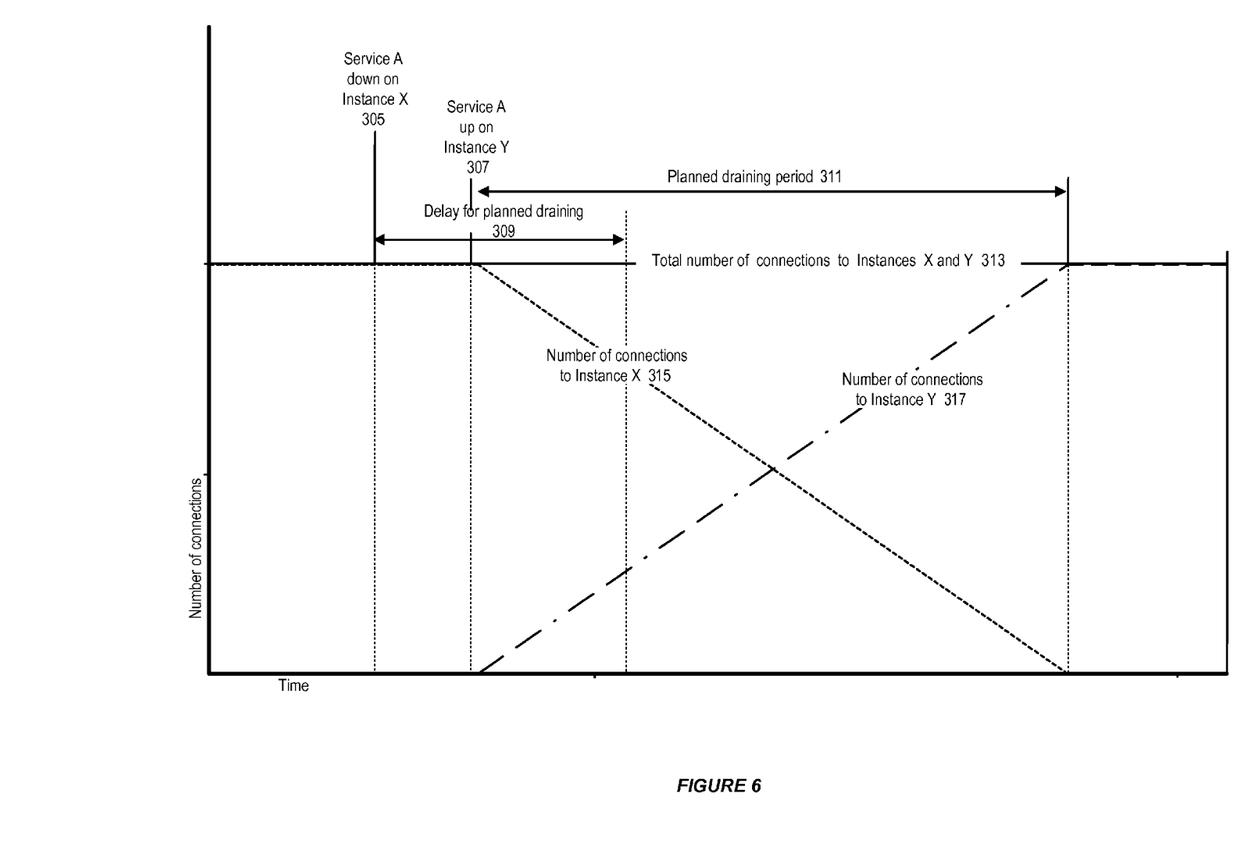
FIG. 6 illustrates a planned migration of service connections in a clustered database environment, in accordance with an alternative embodiment.

FIG. 6 illustrates a planned migration of service connections in a clustered database environment, in accordance with an alternative embodiment.

As shown in FIG. 6, in accordance with an embodiment, a service, e.g., Service A, can be relocated by a database administrator from a source database instance, e.g., Instance X, to a target database instance, e.g., Instance Y. In accordance with an embodiment, during the relocation of the service, the service is stopped first on a source instance 305, and then comes back up on a target instance 307.

In accordance with an embodiment, after the service is stopped on the source instance, and before it comes back up on the target instance, the connection pool is configured to maintain the connections that have been established to the source instance for a time period up to the delay-for-planned-draining 309.

As further shown in FIG. 6, after the service comes back on the target instance, the connection pool is configured to receive a notification event and start the planned-draining-period 311, over which migration of the service connections can be spread. As shown in FIG. 6, during the planned-draining-period, the number of connections for the service to the source instance 317 steadily decreases, while the number of connections for the service to the target instance steadily increases, until the planned-draining-period elapses.

In accordance with an embodiment, the connections are gradually migrated from the source to the target instance, e.g., a certain number of connections per second. In accordance with an embodiment, the source instance can continue to serve the connections to be migrated. As a result, throughout the service relocation, the total number of connections for the service to the source and target instance 313 remains generally steady.

Figure 7:
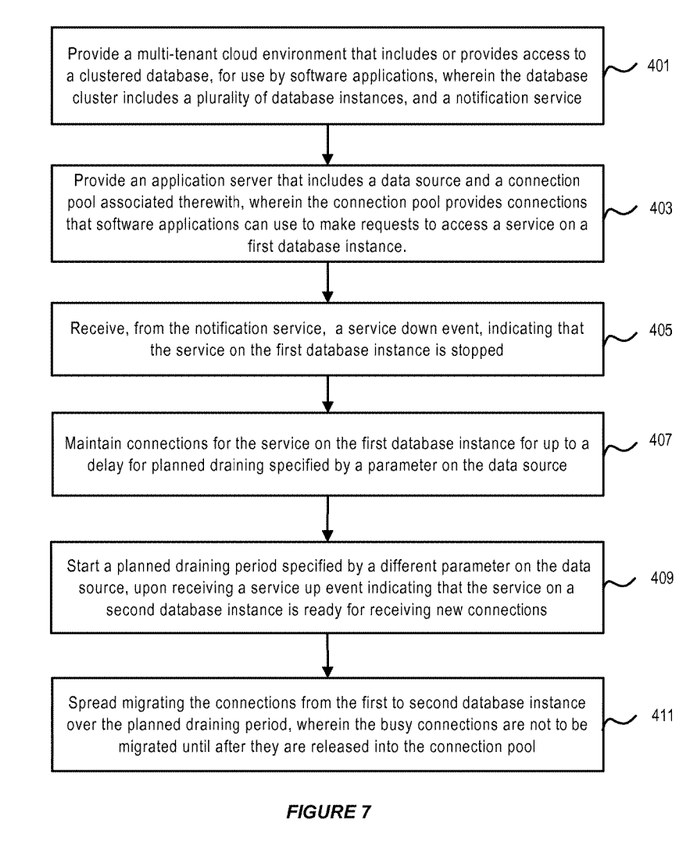
FIG. 7 is a flowchart that illustrates a method for a planned migration of service connections in a clustered database environment, in accordance with an embodiment.

FIG. 7 is a flowchart that illustrates a method for a planned migration of service connections in a clustered database environment, in accordance with an embodiment.

As shown in FIG. 7, in accordance with an embodiment, at step 401, a multi-tenant cloud that includes or provides access to a clustered database for use by software applications is provided, wherein the database cluster includes a plurality of database instances, and a notification service.

At step 403, an application server that includes a data source and a connection pool associated therewith is provided, wherein the connection pool provides connections that software applications can use to make requests to access a service on a first database instance.

At step 405, a "service down" event is received from the notification service, where the notification service detects a state change in the database cluster indicating the service on the first database instance is stopped.

At step 407, the existing connections to the stopped service are maintained for a time period up to a delay-for-planned-draining specified by a parameter on the data source. In accordance with an embodiment, during the period of delay, the database instance hosting the service can continue serving the existing connections that have been established through the service, but does not allow any new connections to be opened to the service.

At step 409, a "service up" event is received by the connection pool from the notification service, wherein the "service up" event indicates the service is ready on the second database instance to receive new connections. In accordance with an embodiment, the "service up" event can also start a planned-draining-period specified by a planned-draining-period parameter on the data source.

At step 411, the connection pool spreads migration of the connections from the first to second database instance over the planned-draining-period. In accordance with an embodiment, the busy connections are not to be migrated until after they are released into the connection pool.

Illustrative Examples

As described above, the current implementation of service relocation can cause a disconnect storm and a logon storm, resulting in a significant dip in throughput and a spike in response times. In accordance with various embodiments, the system can address these problems by use of a delay-for-planned-draining parameter, and a planned-draining-period parameter, as described above.

When the service is stopped on the existing database instance, the connection pool will not migrate the connections immediately but delay the migration for up to a period of time as specified by a parameter associated with a data source, until the service is up on a new database instance. After receiving a notification that the service is ready for receiving new connections on the new database instance, the connection pool immediately starts to migrate the connections in a manner that the migration is equally spread over a planned-draining-period specified by a different parameter associated with the data source.

Figure 8:
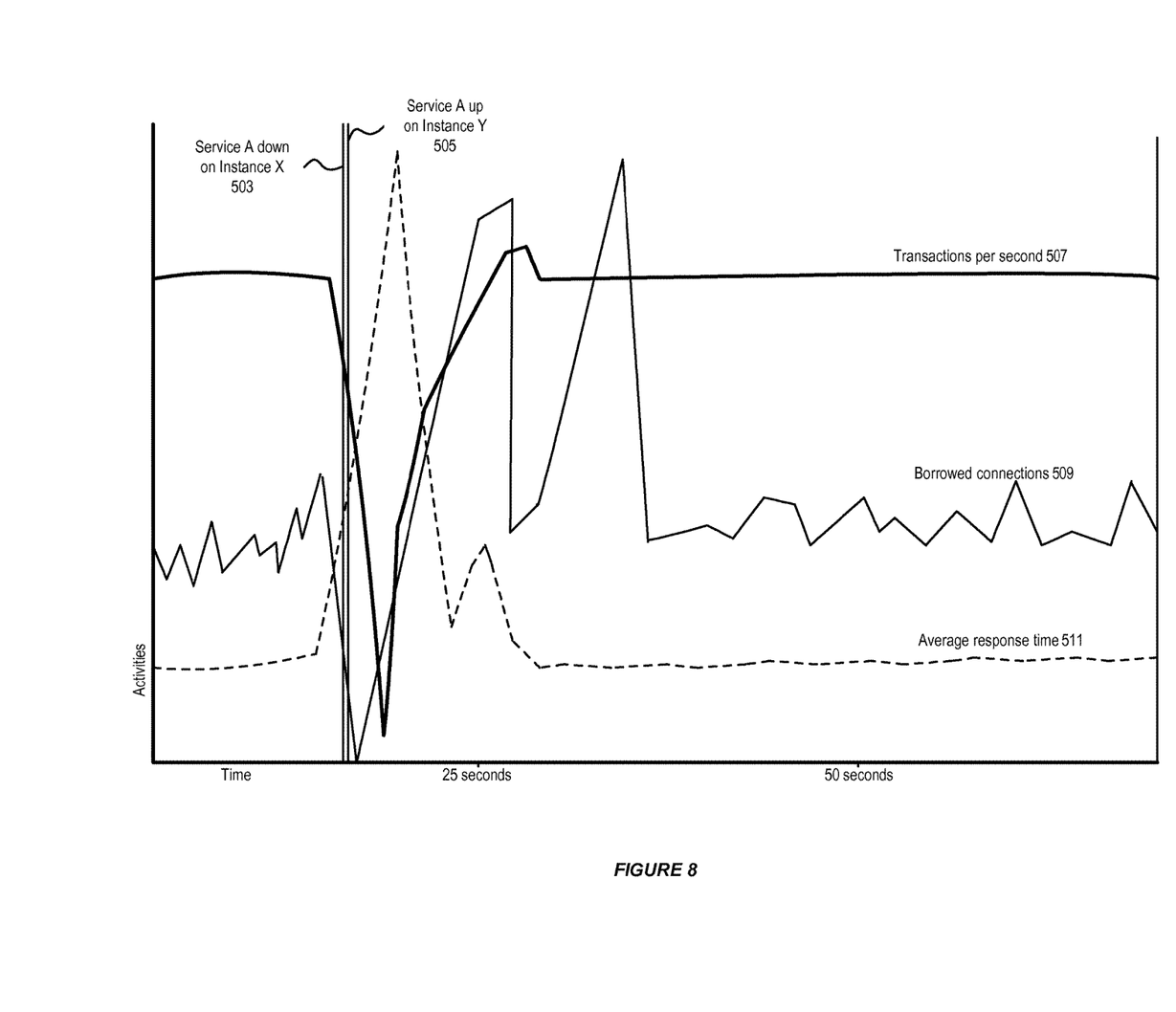
FIG. 8 illustrates problems of an existing implementation of service relocation in a clustered database environment, in accordance with an embodiment.

FIG. 8 illustrates problems of an existing implementation of service relocation in a clustered database environment, in accordance with an embodiment. In particular, FIG. 8 illustrates the changes of a plurality of performance measurements over time when a service is moved from an existing database instance to a new database instance, wherein a PDB needs to be opened for the service.

As shown in FIG. 8, a service (e.g., Service A) is shut down 503 on a source instance (e.g., Instance X), which immediately leads to a considerable dip in the number of transactions that can be processed per second 507. This sudden dip in the number of transactions is caused by a sudden termination of all connections to the service on the source instance while the service is not available to receive connections on the target instance. It can take up to several seconds (e.g., a PDB needs to be opened on the target instance) for the service to be up and ready to receive new connections 505. While the service is getting ready on the target instance, no connection exists in the connection pool to fulfill connection requests from a software application, which may lead to exceptions or errors. After the service is up on the target service, client requests can face empty buffer cache, leading to 100% remote buffer gets or disk reads for the first requests, which prolongs the adverse impact of service relocation on the system performance under the existing approach.

As further shown in FIG. 8, other performance measurements demonstrate a pattern consistent with the transactions per second measurement. For example, the borrowed connections measurement 509 displays a sudden dip prior to the dip in transactions per second, because this is no more connections in the pool to be borrowed. The average response time 511 displays a spike, indicating a slow response of software applications to client requests.

Figure 9:
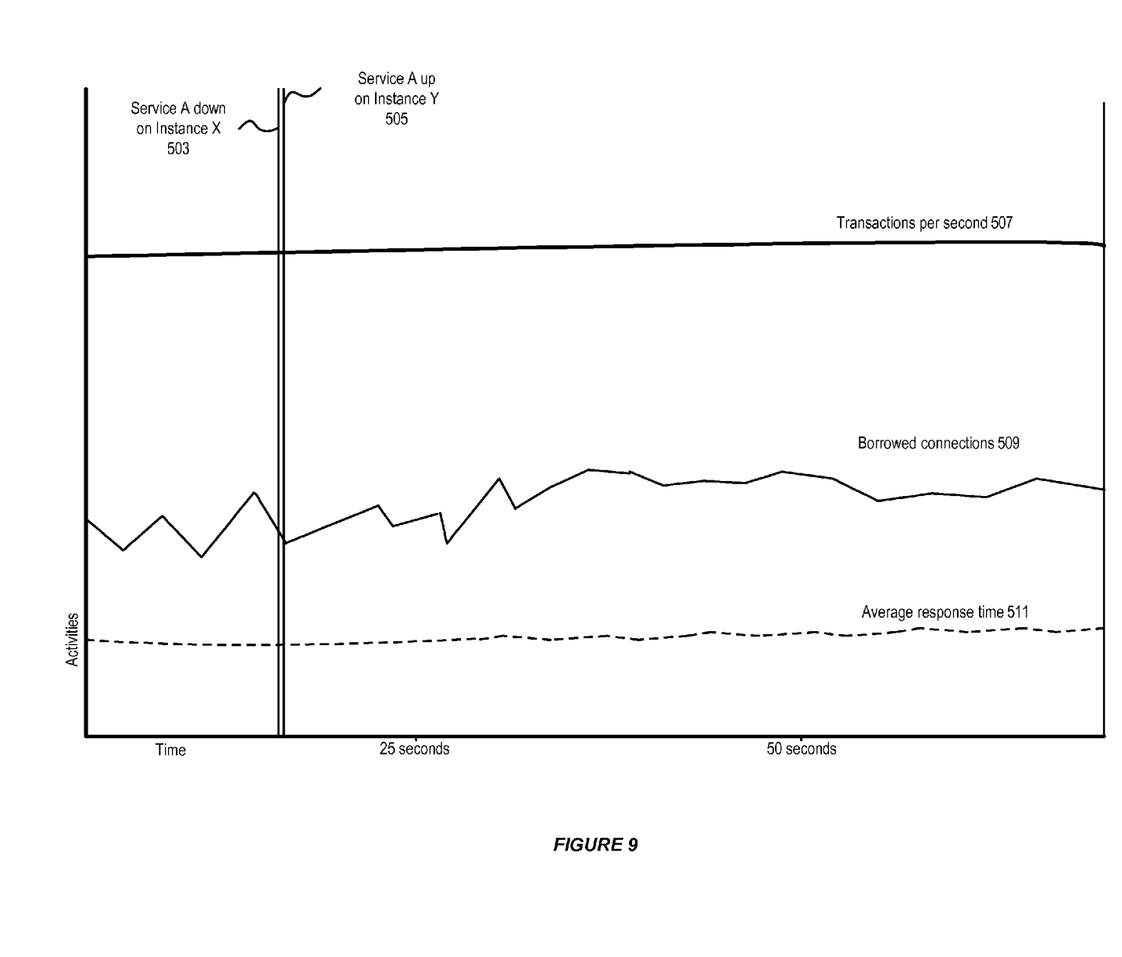
FIG. 9 illustrates benefits of a planned migration of service connections in a clustered database environment, in accordance with an embodiment.

FIG. 9 illustrates benefits of a planned migration of service connections in a clustered database environment, in accordance with an embodiment.

As shown in FIG. 9, the planned migration of service connections can greatly reduce the impact of service relocation on running workloads and provide a perfectly smooth migration, without any noticeable effects on throughput or response times of software applications.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for a planned migration of service connections in a clustered database, comprising:
    one or more computers with one or more processors;
    a clustered database including first and second database instances and a notification service associated therewith, wherein the notification service broadcasts notifications that describe state changes in the clustered database;
    an application server that includes a data source and a connection pool associated therewith, wherein the connection pool provides a plurality of connections that an application uses to connect to the first database instance for a service thereon, and wherein the data source is associated with parameters including a delay-for-planned-draining parameter and a planned-draining-period parameter for rebalancing the plurality of connections;
    wherein upon receiving a notification event that the service is stopped on the first database instance, the connection pool delays migrating the plurality of connections for up to a period of delay defined by the delay-for-planned-draining parameter, and during the period of delay, the connection pool continues allocating idle connections from the connection pool to the software application; and
    wherein upon receiving a notification event indicating the service is up on the second database instance, the connection pool is operable to spread migrating the plurality of connections from the first to the second database instance over a time period defined by the planned-draining-period parameter.

2. The system of claim 1, wherein the connection pool is a Universal Connection Pool (UCP) that provides access to the clustered database using JDBC.

3. The system of claim 1, wherein the clustered database is a multi-tenant database that provides a pluggable database (PDB) for a tenant on a single database instance.

4. The system of claim 3, wherein the service is a singleton service that exposes the PDB for the tenant.

5. The system of claim 1, wherein the connections in use are migrated after they are returned to the connection pool.

6. The system of claim 1, wherein if the notification event is not received when the delay-for-planned-draining elapses, the connection pool is operable to close the plurality of connections to the first database instance.

7. The system of claim 1, wherein the migration of the plurality of connections in the connection pools are equally spread over the time period defined by the planned-draining-period parameter.

8. The system of claim 1, wherein the connection pool does not receive the notification event indicating the service is up on the second database instance when the time period defined by the delay-for-planned-draining parameter elapses, each of the plurality of connections to the service on the first database instance are closed.

9. The system of claim 1, wherein the notification event indicating the service is up on the second database instance is received within the period of delay specified by the delay-for-planned-draining parameter, the connection pool immediately starts to migrate the idle connections.

10. A computer-implemented method for a planned migration of service connections in a database cluster, comprising:
    providing a clustered database including first and second database instances and a notification service associated therewith, wherein the notification service broadcasts notifications that describe state changes in the clustered database;
    providing an application server executing on one or more microprocessors, wherein the application server includes a data source and a connection pool associated therewith,
        wherein the connection pool provides a plurality of connections that a software application uses to connect to the first database instance for a service thereon, and
        wherein the data source is associated with parameters including a delay-for-planned-draining parameter and a planned-draining-period parameter for rebalancing the plurality of connections;
    delaying, by the connection pool, migrating the plurality of connections for up to a period of delay defined by the delay-for-planned draining parameter in response to receiving a notification event that the service is stopped on the first database instance, wherein the connection pool continues allocating idle connections from the connection pool to the software application during the period of delay;
    receiving, from the notification service, a notification event indicating the service is up on the second database instance; and
    spreading migrating the plurality of connections from the first to the second database instance over a time period defined by the planned-draining-period parameter.

11. The method of claim 10, wherein the connection pool is a Universal Connection Pool (UCP) that provides access to the clustered database using JDBC.

12. The method of claim 10, wherein the clustered database is a multi-tenant database that provides a pluggable database (PDB) for a tenant on a single database instance.

13. The method of claim 12, wherein the service is a singleton service that exposes the PDB for the tenant.

14. The method of claim 10, wherein the connections in use are migrated after they are returned to the connection pool.

15. The method of claim 10, wherein if the notification event is not received when the delay-for-planned-draining elapses, the connection pool is operable to close the plurality of connections to the first database instance.

16. The method of claim 10, wherein the migration of the plurality of connections in the connection pools are equally spread over the time period defined by the planned-draining-period parameter.

17. The method of claim 10, wherein the connection pool does not receive the notification event indicating the service is up on the second database instance when the time period defined by the delay-for-planned-draining parameter elapses, each of the plurality of connections to the service on the first database instance are closed.

18. A non-transitory computer readable medium, including instructions stored thereon which when read and executed by one or more computers cause the one or more computers to perform the steps comprising:
configuring a clustered database including first and second database instances and a notification service associated therewith, wherein the notification service broadcasts notifications that describe state changes in the clustered database;
configuring an application server executing on one or more microprocessors, wherein the application server includes a data source and a connection pool associated therewith,
wherein the connection pool provides a plurality of connections that a software application uses to connect to the first database instance for a service thereon, and
wherein the data source is associated with parameters including a delay-for-planned-draining parameter and a planned-draining-period parameter for rebalancing the plurality of connections;
delaying, by the connection pool, migrating the plurality of connections for up to a period of delay defined by the delay-for-planned draining parameter in response to receiving a notification event that the service is stopped on the first database instance, wherein the connection pool continues allocating idle connections from the connection pool to the software application during the period of delay;
receiving, from the notification service, a notification event indicating the service is up on the second database instance; and
spreading migrating the plurality of connections from the first to the second database instance over a time period defined by the planned-draining-period parameter.

19. The non-transitory computer readable medium of claim 18, wherein the connections in use are migrated after they are returned to the connection pool.

20. The non-transitory computer readable medium of claim 18, wherein if the notification event is not received when the delay-for-planned-draining elapses, the connection pool is operable to close the plurality of connections to the first database instance.

* * * * *

UNITED STATES PATENT AND TRADEMARK OFFICE
CERTIFICATE OF CORRECTION

PATENT NO. : 9,678,995 B2
APPLICATION NO. : 14/273192
DATED : June 13, 2017
INVENTOR(S) : Michael et al.

It is certified that error appears in the above-identified patent and that said Letters Patent is hereby corrected as shown below:

In the Drawings

On sheet 7 of 9, in FIGURE 7, under Reference Numeral 405, Line 1, delete "service, a" and insert -- service, a --, therefor.

In the Specification

In Column 5, Line 6, delete "sever." and insert -- server. --, therefor.

In Column 5, Line 55, delete "the a" and insert -- a --, therefor.

Signed and Sealed this
Twentieth Day of February, 2018

Andrei Iancu
*Director of the United States Patent and Trademark Office*